Oct. 1, 1946.    C. VOLZ    2,408,711
APPARATUS TO DETECT CHANGE OF VOLTAGE
Filed June 15, 1945
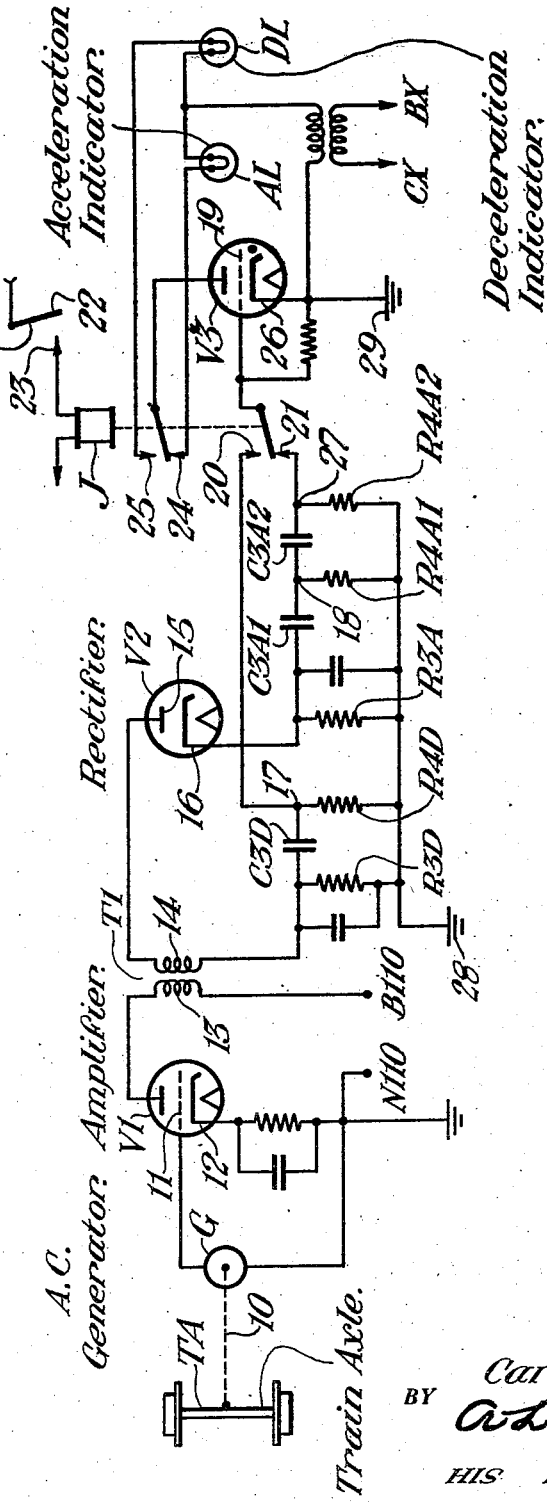
INVENTOR.
Carl Volz.
BY
HIS ATTORNEY Patented Oct. 1, 1946

2,408,711

UNITED STATES PATENT OFFICE 2,408,711

APPARATUS TO DETECT CHANGE OF VOLTAGE

Carl Volz, Pittsburgh, Pa., assignor to The Union Switch & Signal Company, Swissvale, Pa., a corporation of Pennsylvania Application June 15, 1945, Serial No. 599,677

5 Claims. (Cl. 177—311.5)

My invention relates to apparatus to detect changes of voltages, and more particularly to apparatus to detect changes of speed of a moving element through voltage changes created thereby.

Variations in an operating condition of an element may be detected by determining the changes of the voltage of a generator driven in synchronism with the operating condition of the element. For example, variations in the speed of a railway train may be detected by measuring the changes of the voltage of a generator driven from some element of the train in accordance with the speed of the train.

Accordingly, a feature of my invention is the provision of novel and improved apparatus to detect changes of voltage.

Another feature of my invention is the provision of novel means to detect changes of the speed of an element through detection of the changes in the voltage of a generator driven from the element.

Specifically, a feature of my invention is the provision of novel means to detect acceleration and deceleration of a railway train through the changes of the voltage of a generator driven from a train axle.

Again, a feature of my invention is the provision of apparatus of the type here involved incorporating novel means to avoid firing of a gaseous electronic tube due to a circuit failure or to a current surge in the power applied to the apparatus.

Other features, objects and advantages of my invention will appear as the specification progresses.

The foregoing features, objects and advantages embodying my invention I attain by the provision of a novel and improved circuit network between a source of voltage and the control electrode or grid of a grid controlled gas tube which governs an electroresponsive device. The voltage source is preferably a generator, the voltage of which is directly proportional to the speed at which the generator is driven. The circuit network preferably includes an amplifier, a rectifier, capacitors, and resistors connected in such a manner that a capacitor is charged and discharged through a resistor in step with increases and decreases in the variations of the control voltage. That is, the charge of the capacitor is varied at a rate that corresponds to the rate of change in the control voltage. The voltage developed across this resistor as created by such charging and discharging current of the capacitor is applied to a control electrode of the gas tube to fire the tube in response to a predetermined voltage change. Thus, the tube is fired in response to a predetermined rate of change, either up or down, of the generator or control voltage with the result that the electroresponsive device governed by the gas tube is energized in response to a predetermined rate of change in the generator voltage. Also, the circuit network is arranged in such a manner that current surges due to power being applied to the network and circuit element failure result either in no firing voltage being applied to the control electrode of the gas tube or to a negative voltage being applied to render the tube inoperative. For example, on a railway train such a circuit network may be interposed between an axle driven generator and a gas tube which governs indicators and a predetermined acceleration or deceleration of the train detected through the indicators governed by the gas tube.

I shall describe one form of apparatus embodying my invention, and shall then point out the novel features thereof in claims.

The accompanying drawing is a diagrammatic view showing one form of apparatus embodying my invention when used to detect either a predetermined increase or decrease in the voltage of a generator driven in accordance with the speed of a railway train. It is to be understood that my invention is not limited to this one application and this application of the apparatus embodying my invention serves to illustrate the many places where the apparatus is useful.

Referring to the drawing, the reference character TA designates a wheel and axle unit of a railway train to which a generator G is connected. The form of connection for the generator may be of any one of several types of drive mechanism, and such drive mechanism is indicated conventionally by a dotted line 10. The generator G is preferably an alternating current generator of the type the output voltage of which is proportional to the speed at which the generator is driven so that the output voltage of the generator G is directly proportional to the rate at which the axle of the train is rotating, and in turn is directly proportional to the speed of the train. The generator G may be, for example, of the type having a permanent magnet field.

The generator G is connected across control grid 11 and cathode 12 of an amplifier tube V1, which is provided with an anode-cathode circuit powered from a source the terminals of which are indicated at B110 and N110, and which anode circuit includes a primary winding 13 of a coupling transformer T1. The parts are arranged for tube V1 to function as an amplifier and thus there is created in the anode circuit of the tube an alternating current component which corresponds to the alternating voltage of the generator G. It follows that an alternating electromotive force is induced in secondary winding 14 of transformer T1, the value of such electromotive force being proportional to the value of the voltage of generator G and in turn proportional to the rate of rotation of the wheel and axle unit TA. Secondary winding 14 of transformer T1 is connected to the anode 15 and cathode 16 of a rectifier tube V2 through two resistors R3A and R3D in series, and rectified current flows in these resistors to create corresponding voltage drops, and which voltage drops are proportional to the voltage of the generator G.

A capacitor C3D is connected across resistor R3D through a resistor R4D and is charged at a potential corresponding to the voltage drop across resistor R3D. Similarly, a capacitor C3A1 is connected across resistor R3A through a resistor R4A1 and is charged at a potential corresponding to the voltage drop across resistor R3A. The junction terminal 17 of capacitor C3D and resistor R4D and the junction terminal 18 of capacitor C3A1 and resistor R4A1 are arranged to be connected to a control electrode 19 of a gas tube V3 according as a relay J is picked up to close front contact 20 or is released to close back contact 21. The connection of terminal 18 to control electrode 19 includes another capacitor C3A2 and another resistor R4A2 for reasons to appear shortly.

Relay J serves as a selector and it may be controlled in any suitable manner, and as shown it is energized through an obvious circuit including a contact member 22 governed by the brake pipe pressure of the train of which the wheel and axle unit TA is a part. Under normal brake pipe pressure the contact member 22 is operated to its right-hand position, that is, to the position shown in the drawing, and relay J is deenergized, but a reduction of brake pipe pressure to apply the train brake causes the contact member 22 to be operated to the left to engage a contact 23 and complete a circuit for energizing relay J. With relay J deenergized closing back contact 24 an acceleration indicator AL is included in the anode circuit of gas tube V3 and such indicator is energized when the tube is fired. With relay J energized closing front contact 25, a deceleration indicator DL is included in the anode circuit of tube V3 to be energized when the tube is rendered conductive.

Normally, that is, when the train of which the wheel and axle unit TA is a part is moving at a substantially uniform speed, the generator G supplies an alternating voltage of a value predetermined for that speed. This alternating voltage is amplified at tube V1, rectified at tube V2 and capacitor C3D is charged at a voltage corresponding to the voltage drop across resistor R3D, the charge remaining substantially constant as long as the speed of the train remains constant. Similarly, capacitor C3A1 is charged at a voltage corresponding to the voltage drop across resistor R3A and this charge remains substantially constant as long as there is no change in the speed of the train. It is clear that the voltages of the charges of capacitors C3D and C3A1 increase and decrease in step with increases and decreases in the rate of rotation of the wheel and axle unit TA.

Assuming that the train brakes are applied and there is a slowing down of the train speed, a corresponding reduction in the voltage delivered by generator G takes place. This reduction of voltage results in capacitors C3D and C3A1 partially discharging through resistors R4D and R4A1, respectively. Since the selector relay J is energized in response to a reduction of brake pipe pressure, the voltage drop created across resistor R4A1 due to the discharge of capacitor C3A1 serves no useful purpose at the time, but the voltage drop created across resistor R4D due to the discharge of capacitor C3D is applied across the control electrode 19 and cathode 26 of the gas tube V3 through front contact 20 of relay J, and the ground electrodes 28 and 29.

This voltage thus applied to control electrode 19 of the tube V3 is proportional to the rate of discharge of the capacitor C3D and in turn is proportional to the deceleration of the wheel and axle unit TA. The parts are so proportioned that a predetermined deceleration of the wheel and axle unit TA causes a predetermined decrease in the voltage of generator G with a corresponding discharge from capacitor C3D and the voltage drop across resistor R4D applied to control electrode 19 of tube B3 drives the control electrode 19 position in potential with respect to cathode 26 sufficient that tube V3 is made conductive. With tube V3 conductive, the anode current flowing therethrough energizes the deceleration lamp DL through front contact 25 of relay J and lamp DL serves to indicate this deceleration of the train.

In the case the train brakes are released and the train is increasing its speed, a corresponding acceleration occurs, and there will be a corresponding increase in the voltage of generator G with a resultant rate of charging of the capacitors C3A1 and C3D. This time the circuit connection from the capacitor C3D is open at front contact 20 of the selector relay J and the voltage drop across resistor R4D created by the charging of capacitor C3D is ineffective. However, the charging current for the capacitor C3A1 creates a corresponding voltage drop across resistor R4A1 with the junction terminal 18 of resistor R4A1 and capacitor C3A1 negative, and this in turn causes a high rate of charge of capacitor C3A2 through resistor R4A2 with the junction terminal 27 of resistor R4A2 and capacitor C3A2 positive, and since terminal 27 is connected to control electrode 19 this voltage drives the control electrode 19 of gas tube V3 in the positive direction in potential with respect to the cathode 26 and tube V3 is fired to bring about the energization of the acceleration indicator AL, which is now connected to the anode circuit through back contact 24 of the selector relay J.

The connection of secondary winding 14 of transformer T1 is such that the electromotive force induced therein due to the current surge when direct current power is applied to the plate circuit of tube V1 is of a polarity that renders the cathode of rectifier tube V2 positive and no action takes place beyond tube V2.

It is clear from an inspection of the drawing that if capacitor C3D is short circuited a negative potential is applied to control electrode 19 of tube V3 in the event front contact 20 of selector relay J is closed and the gas tube V3 is made inoperative and no untimely energization of the deceleration indicator DL occurs. If either capacitor C3A2 or C3A1 is short circuited, no change in potential occurs at the control electrode of tube V3.

The use of the second capacitor C3A2 and additional resistor R4A2 serves to provide additional protection against non-operation due to one capacitor C3A1 or C3A2 breaking down. If one of these capacitors becomes short circuited, the other capacitor permits continuous operation and the defective capacitor can be checked and removed at the next inspection of the equipment.

It is to be pointed out that in place of using a selector relay and selecting the connection of the tube V3 to the circuit network for the control electrode to be connected either at junction terminal 17 to detect deceleration or at junction terminal 27 to detect acceleration, two gas tubes similar to tube V3 can be used with the control electrode of one such tube connected to junction terminal 17 to detect deceleration of the moving element, and the control electrode of the other tube connected to the junction terminal 27 of the network to detect acceleration of the moving element. It is to be understood that my invention includes such alternative arrangement.

It is to be seen therefore that there is provided in the drawing apparatus to detect predetermined acceleration or predetermined deceleration of a moving element and untimely operation or energization of the indicating means due to current surges or failure of circuit elements are avoided.

Although I have herein shown and described but one form of apparatus to detect changes of voltages embodying my invention, it is understood that various changes and modifications may be made therein within the scope of the appended claims without departing from the spirit and scope of my invention.

Having thus described my invention, what I claim is:

1. In combination, a source of alternating voltage operatively associated with an operating element to supply a voltage which varies according to a given variable condition of the operating element, an electro-responsive indicating means, ionization means, means to energize said indicating means by conduction current of the ionization means but said ionization means normally deionized; a circuit network including a rectifier, capacitors and resistors connected to said voltage source to charge and discharge said capacitors in step with increases and decreases of the voltage of said source to create corresponding direct voltages across said resistors by the charging and discharging currents; and said circuit network connected to control elements of said ionization means to effect ionization and a resultant conduction current by said direct voltage due either to a predetermined rate of increase or a predetermined rate of decrease in the voltage of said source.

2. In combination, an alternating current generator driven from a variable speed element to supply an alternating voltage proportional to the speed of said element, a rectifier and a first and a second resistor in series receiving an alternating voltage from said generator to create across each of said resistors unidirectional voltages each of which is proportional to the alternating voltage, a first and a second capacitor connected across said first and second resistor respectively to charge and discharge said capacitors in step with variations of said unidirectional voltages, an electroresponsive indicating means, an ionization means, means to couple said indicating means to said ionization means for energization of the indicating means by conduction current of the ionization means but the ionization means normally deionized, and means including resistance to connect said capacitors to control elements of the ionization means to effective ionization and a resultant conduction current in response either to a predetermined charging current of the capacitors or a predetermined discharging current of the capacitors.

3. In combination, an alternating current generator driven from a variable speed element to supply an alternating voltage proportional to the speed of said element, a rectifier and a first and a second resistor in series receiving an alternating voltage from said generator to create across each of said resistors unidirectional voltages each of which is proportional to the alternating voltage, a first capacitor and a third resistor in series connected across said first resistor and a second capacitor and a fourth resistor in series connected across said second resistor to charge and discharge said capacitors and create corresponding voltage drops across said third and fourth resistors in step with variations of said unidirectional voltages, a first and a second indicator, a controlled ionization tube, a selector operable to a first and a second position, means to connect either said first or said second indicator to an anode circuit of said tube according as said selector is operated to its first or second position, and other means to connect either said third resistor or said fourth resistor to a control electrode of said tube according as said selector is operated to its first or second position to fire the tube and energize said first indicator due to the voltage drop caused by a predetermined acceleration of said variable speed element or to fire the tube and energize said second indicator due to the voltage drop caused by a predetermined deceleration of said variable speed element.

4. In combination, an alternating current generator driven from a variable speed element to supply an alternating voltage proportional to the speed of said element, a rectifier and a first and a second resistor in series receiving an alternating voltage from said generator to create across each of said resistors unidirectional voltages each of which is proportional to the alternating voltage, a first capacitor and a third resistor in series connected across said first resistor and a second capacitor and a fourth resistor in series connected across said second resistor to charge and discharge said capacitors and create corresponding voltage drops across said third and fourth resistors in step with variations of said unidirectional voltages, a first and a second indicator, a controlled ionization tube, a selector operable to a first and a second position, means to connect either said first or said second indicator to an anode circuit of said tube according as said selector is operated to its first or second position, circuit means including first and second position contacts of said selector to connect said third and fourth resistors respectively to a control electrode and cathode of said tube to fire the tube and energize said first indicator when a predetermined acceleration of said variable speed element occurs and to fire the tube and energize said second indicator when a predetermined deceleration occurs, and said circuit means connected in such a manner as to drive said control electrode more negative in potential with respect to said cathode when a short circuit condition of either said first or second capacitor occurs.

5. In combination, an alternating current generator driven from a variable speed element to supply an alternating voltage proportional to the speed of said element, an amplifier tube having an anode circuit including a primary winding of a transformer and a control grid circuit connected to said generator to create in a secondary winding of the transformer an alternating voltage proportional to said generator voltage, means including a rectifier and a first and a second resistor in series connected to said secondary winding to create across said first and second resistors unidirectional voltages each of which is proportional to the alternating voltage, a first capacitor and a third resistor in series connected across said first resistor and a second capacitor and a fourth resistor in series connected across said second resistor to charge and discharge said capacitors in step with variations of said unidirectional voltages, a first and a second indicator, and selector operable to a first and a second position, a gas tube having an anode circuit connected either to said first indicator or to said second indicator according as said selector is operated to its first or second position to energize the indicators but said tube normally nonconductive, circuit means to connect either said third or fourth resistor to a control electrode and cathode of the tube according as said selector is operated to its first or its second position to fire the tube and energize the first indicator in response to a predetermined rate of charge of the first capacitor due to acceleration of said element or to fire the tube and energize the second indicator in response to a predetermined rate of discharge of the second capacitor due to deceleration of said element, and said circuit means arranged to drive said control electrode more negative in potential with respect to the cathode when said first capacitor is short circuited, to effect no change in the potential of said control electrode when said second capacitor is short circuited and said rectifier disposed to block a voltage induced in said secondary winding due to a current surge of the amplifier anode current.

CARL VOLZ.